March 18, 1924.
S. SCALPELLI
1,486,925
BUMPER
Filed Aug. 11, 1923    2 Sheets-Sheet 1
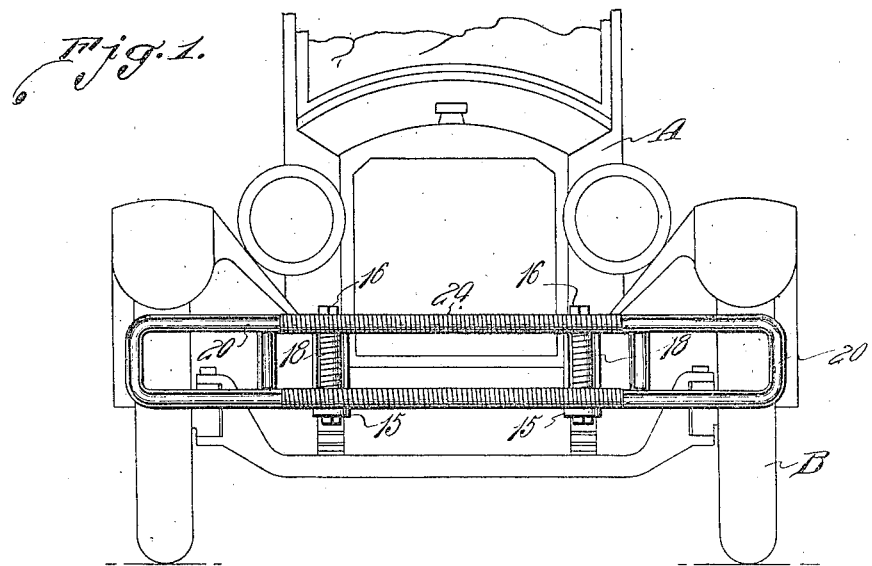
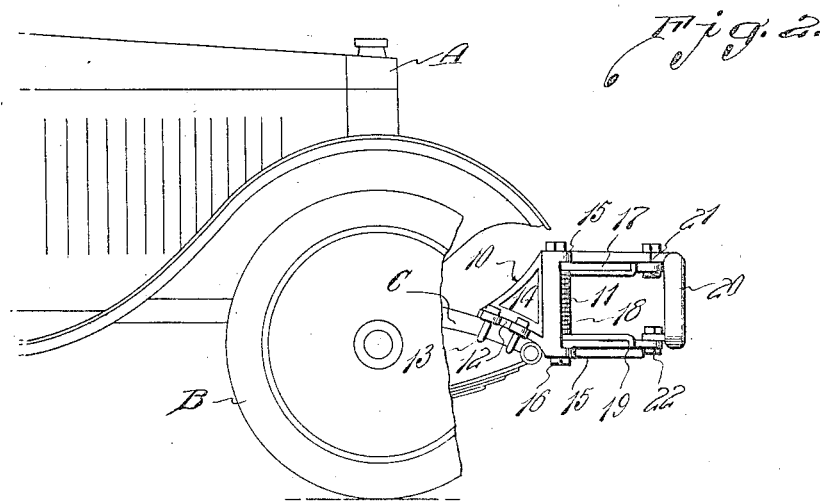
S. Scalpelli
INVENTOR
BY Victor J. Evans
ATTORNEY
WITNESS:

March 18, 1924.
S. SCALPELLI
BUMPER
Filed Aug. 11, 1923  2 Sheets-Sheet 2
1,486,925
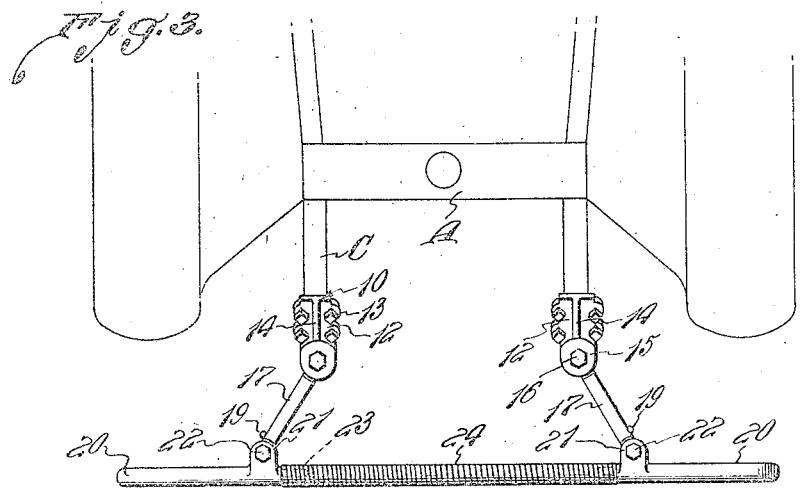
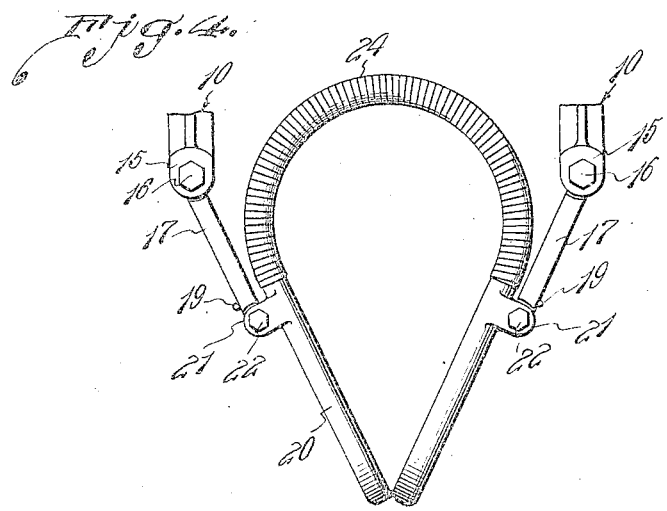
S. Scalpelli
INVENTOR
BY Victor J. Evans
ATTORNEY
WITNESS Patented Mar. 18, 1924.

1,486,925

UNITED STATES PATENT OFFICE.

SYLVESTER SCALPELLI, OF JOLIET, ILLINOIS.

BUMPER.

Application filed August 11, 1923. Serial No. 656,796.

*To all whom it may concern:*

Be it known that I, SYLVESTER SCALPELLI, a citizen of the United States, residing at Joliet, in the county of Will and State of Illinois, have invented new and useful Improvements in Bumpers, of which the following is a specification.

This invention relates to bumpers for motor vehicles and the like and has for its object the provision of a novel bumper which will be a great safety device inasmuch as in case of striking a pedestrian the bumper will yield at its center and define a species of trap which will prevent the person struck from getting under the wheels and being far more seriously injured.

An important and more specific object is the provision of a bumper of this character which includes forwardly extending spring pressed arms which carry wing like guards and which are connected by transversely disposed coil springs which extend substantially the entire distance between the wheels and which will yield rearwardly when striking a person and not only cushion the shock but also define a curved trap which will prevent the person from falling side ways or under the wheels.

An additional object is the provision of a device of this character which will be simple and inexpensive in manufacture, easy to install, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a front elevation of the device mounted upon a motor vehicle.

Figure 2 is a side elevation thereof,

Figure 3 is a top plan view showing the parts in normal position, and

Figure 4 is a similar view showing the parts moved into the position they assume when striking a person.

Referring more particularly to the drawings the letter A designates the front portion of an automobile, B represents the wheels thereof, and C the frame bars.

In carrying out my invention I provide a pair of brackets 10 which are suitably mounted upon the forward ends of the frame bars C and while these brackets might be constructed in different ways and be of any desired size and shape, I have shown them as each including a vertical body portion 11 formed with an attaching portion 12 through which pass U-bolts 13 which embrace the frame bar. Each bracket further includes a web 14 and vertically spaced forwardly extending knuckles 15 through which extends a pivot bolt 16.

Pivotally mounted on the bolts 16 are forwardly and laterally extending arms 17 which are urged outwardly by coil springs 18 which surround the bolts 16, the free ends of the springs being engaged upon the arms as shown at 19.

Carried by the free ends of the arms 17 are substantially U-shaped wing members 20 which are formed at their rear sides with ears 21 pivoted at 22 upon the arms 17. These frames are formed with extensions 23 which extend inwardly with respect to the ears 21, and engaged upon these extensions are upper and lower coil springs 24. These springs 24 have much greater strength than the springs 18 so that they will remain in a normal or straight position as shown in Figure 3 against the resistance of the springs 18.

In the use of the device it will be apparent that normally the parts are disposed as disclosed in Figures 1 to 3 inclusive, the arms 17 diverging slightly and holding the springs 24 straight and under tension considerably in advance of the vehicle. In case of striking a pedestrian, the springs 24 will be forced rearwardly as shown in Figure 4, while at the same time the wings or frames 20 are swung forwardly and toward each other as shown. This forms a species of curved trap which will prevent the person struck from falling over sideways under the wheels of the vehicle. In case a person is struck by the wing frames, he will be deflected off to one side instead of being struck by the wheels. The yieldability of the arms 17 and the springs 24 of course cushions the shock and jar so that likelihood of injury will be greatly lessened.

From the foregoing description and a study of the drawings it will be apparent that I have thus provided a simply constructed and consequently inexpensive spring bumper which is easily installed and which when in position will effectually act as a great safe guard to the public especially in localities where traffic is congested.

Owing to the simplicity of the construction and the fewness of the parts it is apparent that there is nothing to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A spring bumper structure comprising supporting members adapted to be secured at the forward end of the frame of a vehicle, outwardly spring pressed forwardly extending arms pivoted upon the supports, and elongated coil springs connecting said arms.

2. A spring bumper structure comprising supporting members adapted to be secured at the forward end of the frame of a vehicle, outwardly spring pressed forwardly extending arms pivoted upon the supports, and elongated coil springs connecting said arms, said springs having greater strength than the springs urging the arms outwardly.

3. A spring bumper structure comprising supporting brackets adapted to be secured at the forward end of the frame of a vehicle, outwardly spring pressed forwardly extending arms pivoted upon the brackets, and elongated coil springs connecting said arms, said arms being formed as U-shaped frames and having their pivots carrying coil springs having one end secured to the support and the other end secured to the associated arm.

4. A spring bumper structure comprising supporting brackets adapted to be secured at the forward ends of the frame bars of a vehicle, outwardly spring pressed forwardly extending arms pivoted upon the brackets, elongated coil springs connecting said arms, and laterally extending guard frames pivoted upon the forward ends of said arms.

5. A spring bumper structure comprising supporting members adapted to be mounted at the forward end of a vehicle frame, outwardly spring pressed forwardly extending arms pivoted upon the supporting members, and springs connecting said arms.

6. A spring bumper structure comprising supporting members adapted to be mounted at the forward end of a vehicle frame, outwardly spring pressed forwardly extending arms pivoted on said supporting members, U-shaped frames pivoted upon the extremities of said arms and having leg portions extending outwardly, and elongated coil springs connecting said leg portions.

In testimony whereof I affix my signature.

SYLVESTER SCALPELLI.